(12) United States Patent
Tahan et al.

(10) Patent No.: US 8,885,830 B2
(45) Date of Patent: Nov. 11, 2014

(54) METHOD AND APPARATUS FOR DYNAMICALLY ESTABLISHING AND JOINING AN ENCRYPTED COLLABORATIVE COMMUNICATION SESSION

(75) Inventors: Thomas Tahan, San Diego, CA (US); Steven Leonard Cox, Warrenton, VA (US); Weilin Wang, San Diego, CA (US); Martin Woscek, Centreville, VA (US)

(73) Assignee: Mitre Corporation, McLean, VA (US)

( * ) Notice: Subject to any disclaimer, the term of this patent is extended or adjusted under 35 U.S.C. 154(b) by 1207 days.

(21) Appl. No.: 12/434,918

(22) Filed: May 4, 2009

(65) Prior Publication Data

US 2010/0278336 A1    Nov. 4, 2010

(51) Int. Cl.
| | |
|---|---|
| H04L 9/00 | (2006.01) |
| H04W 12/04 | (2009.01) |
| H04L 29/06 | (2006.01) |
| G06F 21/60 | (2013.01) |
| H04L 9/32 | (2006.01) |
| H04L 9/08 | (2006.01) |
| H04W 4/08 | (2009.01) |

(52) U.S. Cl.
CPC ........... *H04L 63/065* (2013.01); *H04L 2209/80* (2013.01); *H04W 4/08* (2013.01); *H04W 12/04* (2013.01); *G06F 21/606* (2013.01); *H04L 2209/60* (2013.01); *H04L 9/3242* (2013.01); *H04L 9/0833* (2013.01)
USPC ............. 380/262; 380/46; 380/278; 713/150; 713/160; 713/163; 713/168; 709/227; 709/228; 709/229; 726/7

(58) Field of Classification Search
CPC ....................................................... H04L 9/12
USPC ........................................................ 713/163
See application file for complete search history.

(56) References Cited

U.S. PATENT DOCUMENTS

| | | | | |
|---|---|---|---|---|
| 7,260,716 | B1 * | 8/2007 | Srivastava | 713/163 |
| 7,434,046 | B1 * | 10/2008 | Srivastava | 713/163 |
| 2004/0105549 | A1 * | 6/2004 | Suzuki et al. | 380/278 |

(Continued)

OTHER PUBLICATIONS

Arvind Mani, "Technical Research Report Authenticated Key Agreement in Dynamic Group", CSHCN TR 2002-1, 2001, pp. 1-79.*

(Continued)

*Primary Examiner* — Luu Pham
*Assistant Examiner* — Canh Le
(74) *Attorney, Agent, or Firm* — Proskauer Rose LLP

(57) ABSTRACT

A system for establishing an encrypted multicast communication session over a communications network can include a client means (e.g., a radio, laptop, workstation, phone, PDA) and a server means. The client means can transmit a request for a first user to join a pre-defined collaborative group, including at least the first user and a second user. The client means can transmit a request for a first user to create or select a collaborative group based on specified criteria. The system can also include a server means that can retrieve, select or generate an encryption key for the collaborative group and transmit the encryption key to the first user via the client means. The server can transmit the encryption key to the second user via a second client means. The client means can communicate via multicast, encrypting end-to-end above the network layer using the encryption key received from the server means.

23 Claims, 4 Drawing Sheets

(56) References Cited

U.S. PATENT DOCUMENTS

| | | | |
|---|---|---|---|
| 2006/0168446 A1* | 7/2006 | Ahonen et al. | 713/163 |
| 2007/0143600 A1* | 6/2007 | Kellil et al. | 713/163 |
| 2007/0297613 A1* | 12/2007 | Ghosh | 380/277 |
| 2008/0028211 A1* | 1/2008 | Tanizawa et al. | 713/163 |
| 2008/0095183 A1* | 4/2008 | Bijwaard et al. | 370/432 |
| 2009/0144544 A1* | 6/2009 | Koo et al. | 713/163 |
| 2009/0164583 A1* | 6/2009 | Zhu | 709/205 |
| 2009/0198666 A1* | 8/2009 | Winston et al. | 707/5 |
| 2009/0320102 A1* | 12/2009 | Ou | 726/4 |
| 2009/0328205 A1* | 12/2009 | Ims et al. | 726/22 |

OTHER PUBLICATIONS

Andreas Sjoholm, "Secure communication for ad-hoc, federated groups", ACM, Mar. 2008, pp. 48-58.*

T. Hardjono et al., The Multicast Group Security Architecture, Network Working Group, Mar. 2004 [online], [retrieved on Sep. 24, 2009]. Retrieved from the Internet <URL:http://www.ietf.org/rfc/rfc3740.txt>.

M. Baugher et al., The Group Domain of Interpretation, Network Working Group, Jul. 2003 [online], [retrieved on Sep. 24, 2009]. Retrieved from the Internet <URL:http://www.ietf.org/rfc/rfc3547.txt>.

B. Weis et al., Updates to the Group Domain of Interpretation, MSEC Working Group, Mar. 6, 2009 [online], [retrieved on Sep. 24, 2009]. Retrieved from the Internet <URL:http://tools.ietf.org/html/draft-ietf-msec-gdoi-update-04.txt>.

J. Arkko et al., MIKEY: Multimedia Internet KEYing, Network Working Group, Aug. 2004 [online], [retrieved on Sep. 24, 2009]. Retrieved from the Internet <URL:http://www.ietf.org/rfc/rfc3830.txt>.

P. Zimmerman et al., ZRTP: Media Path Key Agreement for Secure RTP, Network Working Group, Nov. 26, 2008, [online], [retrieved on Sep. 24, 2009]. Retrieved from the Internet <URL:http://tools.ietf.org/id/draft-zimmermann-avt-zrtp-11.txt>.

Multicast Receiver and Sender Access Control and Its Applicability to Mobile IP Environments: A Survey, *IEEE Communications Surveys & Tutorials*, vol. 7, No. 2 (2005) pp. 46-70.

Coan et al., "HASM: Hierarchical Application-Level Secure Multicast," HASM Secure Multicast System, <draft-coan-hasm-oo.txt>, Apr. 2002, 42 pages.

* cited by examiner

METHOD AND APPARATUS FOR DYNAMICALLY ESTABLISHING AND JOINING AN ENCRYPTED COLLABORATIVE COMMUNICATION SESSION

STATEMENT OF GOVERNMENT INTEREST

This invention was made with government support under contract number W15P7T-09-C-F600. The government may have certain rights in the invention.

FIELD OF THE INVENTION

The invention generally relates to methods and devices for establishing a secure communication session over a communications network. Specifically, the invention relates to establishment of secure multicast communication sessions.

BACKGROUND OF THE INVENTION

One application of communications and networking technologies is to provide for communications among collaborative users. For example, multiple users may participate in a voice conference, some as contributors and others as listeners. Voice over Internet Protocol (VoIP) technology can be used to economically transmit the voice content over the Internet and over private networks that employ Internet technologies. Traditionally, as is the practice on the telephony circuit switched communications model, when multiple parties are participating in a voice conference over the Internet, a conference bridge is used to relay the communications among the parties. Capabilities such as Internet Protocol (IP) multicasting, available on the Internet and private IP-based networks, may not be utilized. This is particularly the case when communications need to be secured, as the Internet multicasting architecture did not incorporate security in the design, and current standards remain incomplete with respect to security over multicast communications.

For transmissions over fixed (non-mobile) networks, use of a conference bridge and secure unicast VoIP communications with that bridge may be an acceptable approach due to the availability of high-speed and high-bandwidth communication channels and the relative reliability of the network infrastructure. However, wireless networks, in particular mobile ad hoc networks, must be as efficient as possible in the usage of the network capacity, and cannot employ approaches that rely on a single component such as a conference bridge, or the communication paths to and from that bridge, being available. Instead, a conferencing architecture such as multicasting is used, since it leverages the broadcast nature of wireless communications and does not rely on a central conference bridge with multiple transmissions of the same information between the bridge and the participants. However, due to the aforementioned limitations with respect to multicast security, the current approach is typically to pre-configure the multicast group and its participants, pre-placing cryptographic keys and other communications parameters at all the end instruments for the users in the conference. If keys and communications parameters are not pre-placed, there is no capability for a user to dynamically join a group, i.e., for a user's end instrument to dynamic acquire the cryptographic key and other communication parameters necessary to participate in the group.

SUMMARY OF THE INVENTION

Enhancements are needed for support of dynamically establishing secure/encrypted collaborative sessions across the Internet or IP-based private networks. The use of dynamically established secure collaborative sessions can remove restrictions associated with the current approach of preplanning multicast groups (e.g., users and end instruments of the multicast groups are predetermined) and user-to-end instrument association. Authorized users can move among different end instruments (a.k.a., clients) (e.g., use different tactical radios, laptops, work stations, phones, Personal Digital Assistants (PDAs), etc.). An authorized user can be defined as a user whose credentials have been authenticated and is authorized to join a collaborative group. Authorized users can securely transmit to other users in a collaborative group upon demand or securely access multicast content from other users in a collaborative group upon demand. Encryption can be performed above the network layer (e.g., at the application layer) of the communications network so that encryption is end-to-end (i.e., from the sending user's application within the sending client to the receiving user's application within a receiving client), even when the communications traverses different network technologies or goes through firewalls. The invention can be utilized, for example, in fixed or mobile ad hoc networks and can enable, for example, secure dynamic multicast sessions across the U.S. government Global Information Grid (GIG) to the tactical edge. Network usage for group communications can be reduced, as conference bridges do not have to be used.

In one aspect, a method for establishing an encrypted multicast communication session over a communications network can include receiving a request from at least a first user (e.g., an initiator) to join a pre-defined collaborative group. The collaborative group can include at least the first user and a second user. The method can include retrieving or generating an encryption key for the pre-defined collaborative group and transmitting (e.g., via a first server) the encryption key for the pre-defined collaborative group to at least a first client of the first user.

The method can also include receiving an identifier for the pre-defined collaborative group from the first user to request joining the pre-defined collaborative group. A uniform resource identifier (URI), a telephone number, or other method of identifying the collaborative group can be received from the first user to request joining the pre-defined collaborative group.

The method can include receiving credentials for at least the first user (e.g., a user name and a password for the first user). The credentials for the first user can be verified/checked against stored credentials to authenticate the first user.

Access permissions for at least the first user can be determined. The access permissions can include whether or not the user is authorized to access the session and, if so, whether the user is authorized to be a contributor or listener. An access permission of "no access" for example, would indicate that the user is not authorized to access the session.

The server can transmit over an appropriately secured channel a multicast address, a transport layer port number, an encryption algorithm selection, a message authentication code algorithm selection, a message authentication code key, an initialization vector or an access mode to a first client of the first user. In some embodiments, a second server transmits the encryption key for the pre-defined collaborative group to a second client of the second user, where the first user and the first server belong to a first domain and the second user and second server belong to a second domain.

In some embodiments, a third server can transmit the encryption key for the pre-defined collaborative group to the first client of the first user via the first server. The third server can also transmit at least one of a multicast address, a transport layer port number, an encryption algorithm selection, a message authentication code algorithm selection, a message authentication code key, an initialization vector or an access mode to the first client of the first user via the first server. The third server can also transmit a termination message to the first client of the first user via the first server where the security of the collaborative group is threatened. The first user and the first server can belong to the first domain and the collaborative group and the third server can belong to a third domain.

The pre-defined collaborative group can include a third user. In some embodiments, the security of the collaborative group can be threatened, for example, due to a compromise of the third user or third user's client. A termination message can be transmitted to the first client of the first user, a second client of the second user and a third client of the third user to terminate the multicast communication session. A second encryption key can be transmitted to the remaining users (e.g., the first client of the first user and the second client of the second user). The first client or the second client can discontinue use of the encryption key after a predetermined time after transmitting the second encryption key. Where the first user and the second user are in different domains, the first server in the first domain can transmit the termination message and the second encryption key to the first client user in the first domain. A second server in the second domain can transmit the termination message and the second encryption key to the second client of the second user belonging to the second domain.

A message can be transmitted to at least the first client of the first user (or the other users in the collaborative group). The message can include for the multicast session, e.g., data corresponding to a multicast address, a transport layer port number, an encryption algorithm selection, a message authentication code algorithm selection, a message authentication code key, an initialization vector or an access mode.

In another aspect, a method for establishing an encrypted multicast communication session over a communications network can include receiving a request from a first user to create or select a collaborative group based on specified criteria. The method can also include selecting or generating an encryption key for the collaborative group and transmitting (e.g., via a server) the encryption key for the collaborative group to at least a first client of the first user.

The collaborative group can be created based on the specified criteria. The collaborative group can also be selected (e.g., from a database of stored collaborative groups) based on the specified criteria. A request from a first user can specify criteria, for example, a geographical location, an organization, a rank, or a set of users. The collaborative group can be either created or selected (e.g., searched and selected from a stored database) based on the specified geographical location, the specified organization, the specified rank, or the specified set of users.

In some embodiments, users can send (e.g., during registration with the server using a client), and a server can receive and store, information relating to a geographical location for at least a first user.

A message can be transmitted to at least the first client of the first user (e.g., or other users of the collaborative group). The message can include data corresponding to the encryption key, a multicast address, a transport layer port number, an encryption algorithm selection, a message authentication code algorithm selection, a message authentication code key, an initialization vector or an access mode.

A multicast session can be encrypted using an encryption key that is selected and assigned by the server from two or more stored encryption keys. A multicast session can also be encrypted by the server generating the encryption key using a random number generator.

In one aspect, a method for establishing an encrypted multicast communication session over a communications network can include transmitting, via a client, a request for a first user to join a pre-defined collaborative group including at least the first user and a second user. An encryption key for the pre-defined collaborative group can be received at a client.

Collaborative content can be transmitted between a first application on a first client and a second application on a second client (e.g., via IP multicast). The collaborative content can include, for example, voice, video, or other data. The content can be encrypted end-application to end-application above the network layer (e.g., of the communications network) of the communications network using the received encryption key as input to the encryption algorithm. A message including data corresponding to the encryption key, a multicast address, a transport layer port number, an encryption algorithm selection, a message authentication code algorithm selection, a message authentication code key, an initialization vector or an access mode can be received, for example, at the client. A user can input his or her credentials (e.g., username and password) into a client which can be transmitted to authenticate the first user.

In yet another aspect, a method for establishing an encrypted multicast communication session over a communications network can include transmitting (e.g., via a client) a request for a first user to create or select a collaborative group based on specified criteria. The collaborative group can be dynamically created/generated or selected based on the specified criteria. The method can include receiving (e.g., at the client) an encryption key for the collaborative group.

Specified criteria such as a geographical location of a user, an organization, a rank, or a set of users can be transmitted to request establishment of a collaborative group. A collaborative group can be selected/dynamically generated/created based on the specified criteria. Collaborative content, such as voice, video, or other data, can be transmitted between a first application on the client and a second application on a second client (e.g., via IP multicast). The content can be encrypted end-application to end-application above the network layer of the communications network using the received encryption key as input to an encryption algorithm. A user can input credentials which can be transmitted to, for example, a server, to authenticate the first user.

A message can include data corresponding to the encryption key, a multicast address, a transport layer port number, an encryption algorithm selection, a message authentication code algorithm selection, a message authentication code key, an initialization vector or an access mode. The message can be sent to a user (e.g., at a client).

In yet another aspect, a system for establishing an encrypted multicast communication session over a communications network can include a client means for transmitting a request for a first user to join a pre-defined collaborative group including at least the first user and a second user. The system can also include a server means for retrieving or generating an encryption key for the pre-defined collaborative group and transmitting the encryption key to the client means.

In still another aspect, a system for establishing an encrypted multicast communication session over a communications network can include a client means for transmitting a request for a first user to create or select a collaborative group based on specified criteria. The system can also include a server means for selecting or dynamically generating/creating the collaborative group based on the specified criteria. The server means can also select or generate an encryption key for the collaborative group and transmit the encryption key to the client means.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Users can join a pre-defined or a dynamically generated or selected collaborative group to transmit/receive collaborative content with other users, which can be encrypted "end to end" above the network layer (e.g., at an application layer) of the communications network. All users of the collaborative group, including, for example, the initiator of a session, can receive selected or generated encryption keys, for example, from their home domain server. Communications can be enabled among users on a client (e.g., devices such as a radio, laptop, workstation, PDA, etc.) using Voice over Internet Protocol (VoIP) transmitted over IP multicast. Communication sessions include, for example, a "static voice net" multicast communication session where the members (e.g., users) within a collaborative group of users are pre-defined, or a dynamic collaborative group communication session where a dynamically created group of users can communicate in a secure multicast session. An authorized user can initiate the call to another user or group of users, meeting certain condition (e.g. geographic locality, rank, or organization). An authorized user can be defined as a user whose credentials (e.g., username and password) have been authenticated and who has been authorized to initiate communication sessions amongst users in a collaborative group. A server (e.g., a Session Initiation Protocol (SIP) server) can bring in the other user(s) on the caller's (e.g., initiator user) behalf, using a multicast address, port and master key determined and distributed by the server. The signaling plane protocol (e.g., SIP or other comparable protocol) and bearer plane cryptographic protocol (e.g., Secure Real-time Transport Protocol (SRTP) or comparable protocol) can reside at the application layer.

Figure 1:
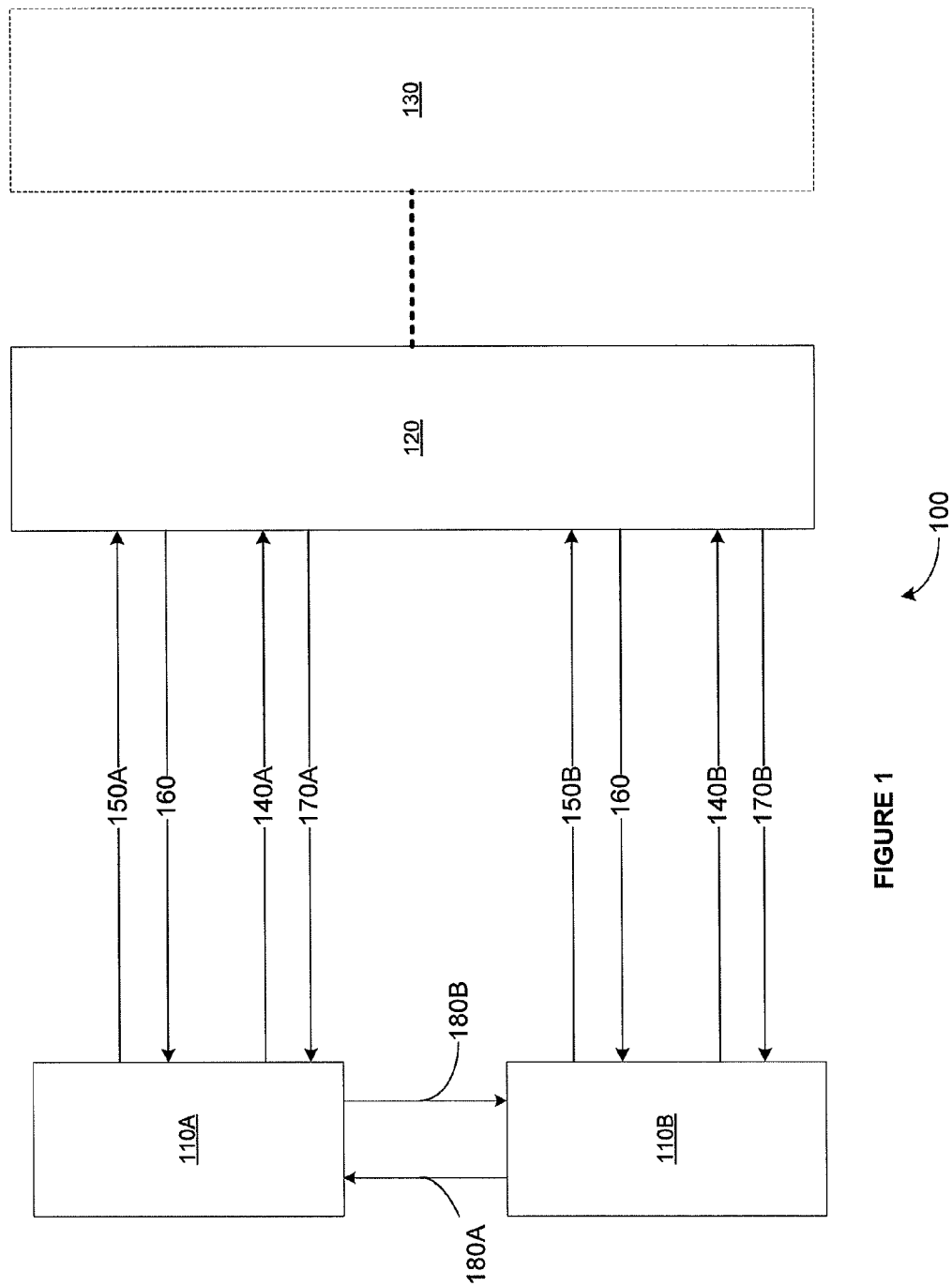
FIG. 1 is a schematic of a system for establishing an encrypted communication session over a communications network, according to an illustrative embodiment of the invention.

FIG. 1 is a schematic of a system 100 for establishing an encrypted communication session over a communications network (e.g., with clients who are members of the same domain), according to an illustrative embodiment of the invention. A system 100 can include one or more clients 110A or 110B (e.g., devices such as radio, laptop, workstation, phone, PDA, etc.). A system 100 can also include one or more servers 120 or 130. The client 110A or 110B can transmit and receive data 180A and 180B on behalf of a user. The client 110A or 110B can transmit a request 150A or 150B on behalf of a user (e.g., initiator or caller) of the client 110A or 110B to join a collaborative group or establish a collaborative group based on specified criteria. The client 110A or 110B can also send credentials 140A or 140B of its user (usually when challenged by server 120). The server 120 can authenticate the identity client 110A's or 110B's user using credentials 140A or 140B. It can then check the access permissions for the collaborative group to determine if the user is authorized to access the group, and the access mode. If the user is authorized to access the group, the server 120 can send client 110A or 110B encryption key 160 for the multicast session and/or communication parameters 170A or 170B. Server 120 can receive the request(s) 150 via the client 110A or 110B. Server 120 can also create a collaborative group by dynamically creating or selecting a collaborative group based on the specified criteria received from client 110A or 110B. Server 120 can retrieve, select or generate encryption keys for the collaborative group. The server 120 can also transmit the encryption key 160 to the user of client 110A or 110B (e.g., including the client user initiating the request to join a pre-defined collaborative group or the client user initiating the request to create and join a collaborative group). Server 120 can be a Session Initialization Protocol (SIP) server and server 130 can be a Lightweight Directory Access Protocol (LDAP) server. The system 100 can support multicast communication sessions among clients. Clients 110A and 110B can send or receive encrypted multicast communications 180A and 180B.

The encryption key 160 can include, for example, a crypto algorithm and algorithm mode selection, master key, salt key, key lifetime, key length, key index, etc. Communication parameters 170A or 170B can include, for example, a multicast address, a transport layer port number, an encryption algorithm selection, a message authentication code algorithm selection, a message authentication code key, an initialization vector or an access mode/access permission. The access mode/access permission can define a client user's access rights to a collaborative group (e.g., as a listener, contributor, whether the user is allowed to join the collaborative group (for example, where "no access" would indicate that the user is not allowed to access the session), etc.). A user can be a member of one or more collaborative groups.

Data relating to the client 110A or 110B users, collaborative groups and other communication parameters can be stored in a database, for example, on server 120 or 130. Stored data relating to the client users can include, for example, credentials for a user 140A or 140B (e.g., a user identifier and password, biometrics, digital certificate, etc.), domain for a user (e.g., indicating the home domain for each user), a status for a user (e.g., inactive, active, registered, etc.), a location for a user (e.g., geographical location), a rank of the user or an organization of the user. Stored data relating to the collaborative groups can include, for example, the users and the identifiers belonging to each collaborative group, a home domain for each collaborative group, an encryption key for a collaborative group, a status for a collaborative group, and access permissions for a collaborative group (e.g., user access rights for each collaborative group, for example, whether a user is contributor, listener, etc.). A domain can be defined as a collection of users and network resources under the control of a single authority. Tables 1-3 below show exemplary embodiments of data relating to the users, collaborative groups, or encryption keys that can be stored in databases, for example, on a server 120 or 130. Table 1 shows a database of collaborative group attributes, including encryption keys, that can be stored, according to an illustrative embodiment of the invention. Table 2 shows a database of access permissions for different collaborative groups, according to an illustrative embodiment of the invention. Table 3 shows a database of credentials for different client 110A or 110B users, according to an illustrative embodiment of the invention. The databases can be populated by a trusted authority.

TABLE 1

| Collaborative Group ID | Master Key | Salt Key | Key Lifetime | RTP Port | IV Base | Status |
|---|---|---|---|---|---|---|
| UR1 | ●●●●●●● | ●●●●●● | ●●●●● | ●●●● | ●●● | ●● |
| UR2 | ●●●●●●● | ●●●●●● | ●●●●● | ●●●● | ●●● | ●● |
|  | ●●●●●●● | ●●●●●● | ●●●●● | ●●●● | ●●● | ●● |

TABLE 2

| Collaborative Group ID | User ID | Access Mode | Status |
|---|---|---|---|
| UR1 | Jack@D1 | Contributor | Active |
|  | Joe@D1 | Contributor | Active |
| UR2 | Jane@D1 | Contributor | Active |
|  | Joe@D1 | Contributor | Active |
|  | John@D1 | Listener | Unknown |

TABLE 3

| User ID | Password | Status |
|---|---|---|
| Jane@D1 | ●●●●● | Registered |
| Joe@D1 | ●●●●● |  |
| John@D1 | ●●●●● | Registered |

Users can be authenticated via clients 110A or 110B and server 120. For example, users can input credentials 140A or 140B (e.g., username and password) into the client 110A and 110B which can be sent to the server 120. Server 120 can authenticate the users by verifying the received credentials with stored credentials (e.g., Table 3 for example, stored either on server 120 or server 130). In some embodiments, the stored credentials are on server 130 and server 120 authenticates the client 110A or 110B user by verifying the received credentials 140A or 140B with the credentials stored on server 130. In some embodiments, a client 110A or 110B user is authenticated each time the client 110A or 110B user requests to join a communications session with other users of a collaborative group.

A user can also be authorized via server 120. For example, when a user requests to join a pre-defined collaborative group or when a user requests establishment of a collaborative group, the server 120 can determine an access permission for the user. The access permissions determine whether a user is part of the collaborative group and, if so, the access mode, i.e., whether the user is a contributor or listener. The server 120 can authorize the user by looking in a database of access permissions for different collaborative groups (e.g., Table 2). The database can be stored, for example, on server 120 or server 130. In some embodiments the database of access permissions are stored on server 130 and server 130 authorizes the user to join the collaborative group by verifying the information stored on server 130.

In some embodiments, a user can send, via the client 110A or 110B, a request 150A or 150B to join a pre-defined collaborative group. The request 150A or 150B can be a message sent from the client 110A or 110B to the server 120 including an identifier for the pre-defined collaborative group, such as, for example, a uniform resource identifier (URI) or a telephone number. The pre-defined collaborative group can include any number of users, for example, the first user of client 110A and the second user of client 110B. In some embodiments, collaborative groups are pre-defined based on specified criteria (e.g., such as geographical location, organization, or rank). For example, if a collaborative group is pre-defined based on rank, the request 150A or 150B to join the collaborative group can include sending a message to the server 120 with a URI specifying the rank of the users for the collaborative group. Server 120 can retrieve or generate an encryption key 160 for the pre-defined collaborative group. In some embodiments, the encryption keys are stored in server 130 and server 120 retrieves the encryption key from server 130. The encryption key 160 can be generated by, for example server 120, for example, using a random number generator. The server 120 can transmit the encryption key 160 for the pre-defined collaborative group to at least the client 110A or 110B user that initiated the request. In some embodiments, the server 120 can transmit the encryption key to other clients (e.g., other users in the collaborative group) where the client users are in the same domain.

A user can also send, via the client 110A or 110B, a request 150A or 150B to establish a collaborative group based on specified criteria. The criteria can specify a set of identified users (e.g., explicitly identifying John Doe, Jane Doe, etc.). The criteria can also be based on a geographical location, an organization or a rank of the users. Server 120 and/or server 130 can have a database of information that has data corresponding to, for example, a geographical location, organization or rank for each user. The database can be compiled based on information received and stored from the users (e.g., via clients 110A or 110B) during, for example, registration of the client 110A or 110B with the server. A collaborative group can be dynamically generated by identifying users that meet the specified criteria. For example, if a user initiates a communication session with users located within 10 miles of a specified location, a collaborative group can be dynamically generated by identifying users in the database that have geographical location that meets this criteria. The server 120 can also search a database (e.g., database in Table 2 stored, for example, on server 120 or sever 130) of collaborative groups that have users meeting the specified criteria. The server 120 can generate an encryption key (e.g., using a random number generator) or select an encryption key from a database of stored encryption keys (e.g., database of encryption keys stored on server 120 or on another server 130) for the collaborative group. In some embodiments, the database of stored encryption keys (e.g., as shown in Table 1) is stored on server 130 and server 120 selects from the database to select an encryption key, for example, unassigned to be assigned to the collaborative group. The server 120 can then transmit the encryption key 160 to at least the client 110A or 110B user initiating the session and initiating the request to establish the collaborative group. In some embodiments, the server 120 transmits the encryption key 160 to any one of the other users in the collaborative group.

The client 110A or 110B can communicate with the server 120 by sending messages. The messages can, for example, include data corresponding to an encryption key 160 or other communication parameters 170A or 170B (e.g., a multicast address, a transport layer port number, an encryption algorithm selection, a message authentication code algorithm selection, a message authentication code key, an initialization vector or an access mode). In embodiments where the client 110A or 110B user requests 150A or 150B to create or select a collaborative group, the client 110A or 110B can send messages to the server 120 including data corresponding to the specified criteria (e.g., data for the geographic location, data for the specified rank, data for the specified organization, or data identifying specific users to be included in the collaborative group). In some embodiments, the server 120 can send a message to client 110A or 110B that includes data, for example, in an attribute field of the message.

Users of a collaborative group can communicate with one another via the clients 110A and 110B. The clients 110A and 110B can transmit and receive collaborative content 180A or 180B including, for example, voice or video. Collaborative content 180A or 180B can be encrypted and transmitted (e.g., via IP multicast) "end to end" at the application layer (e.g., between collaborative applications running on clients 110A and 110B on behalf of their users). The content 180A or 180B can be encrypted end-application to end-application (e.g., on clients 110A or 110B) above the network layer using the received encryption key as input to the encryption algorithm.

In some embodiments, the security of the multicast communications session can be compromised. The security of the collaborative group can be threatened, for example, due to a compromise of the third user or third user's client. In such a case, the communication session can be terminated and a new encryption key can be sent to the users of the group. For example, the collaborative group can include a first user, a second user and a third user. In the event that the security of the third user is compromised, the server can transmit a termination message to members/users of the collaborative group. The server can transmit a second encryption key to the first user and the second user and delete the previous encryption key after a predetermined amount of time (e.g., so as to maintain continuous communication between the users).

Figure 2:
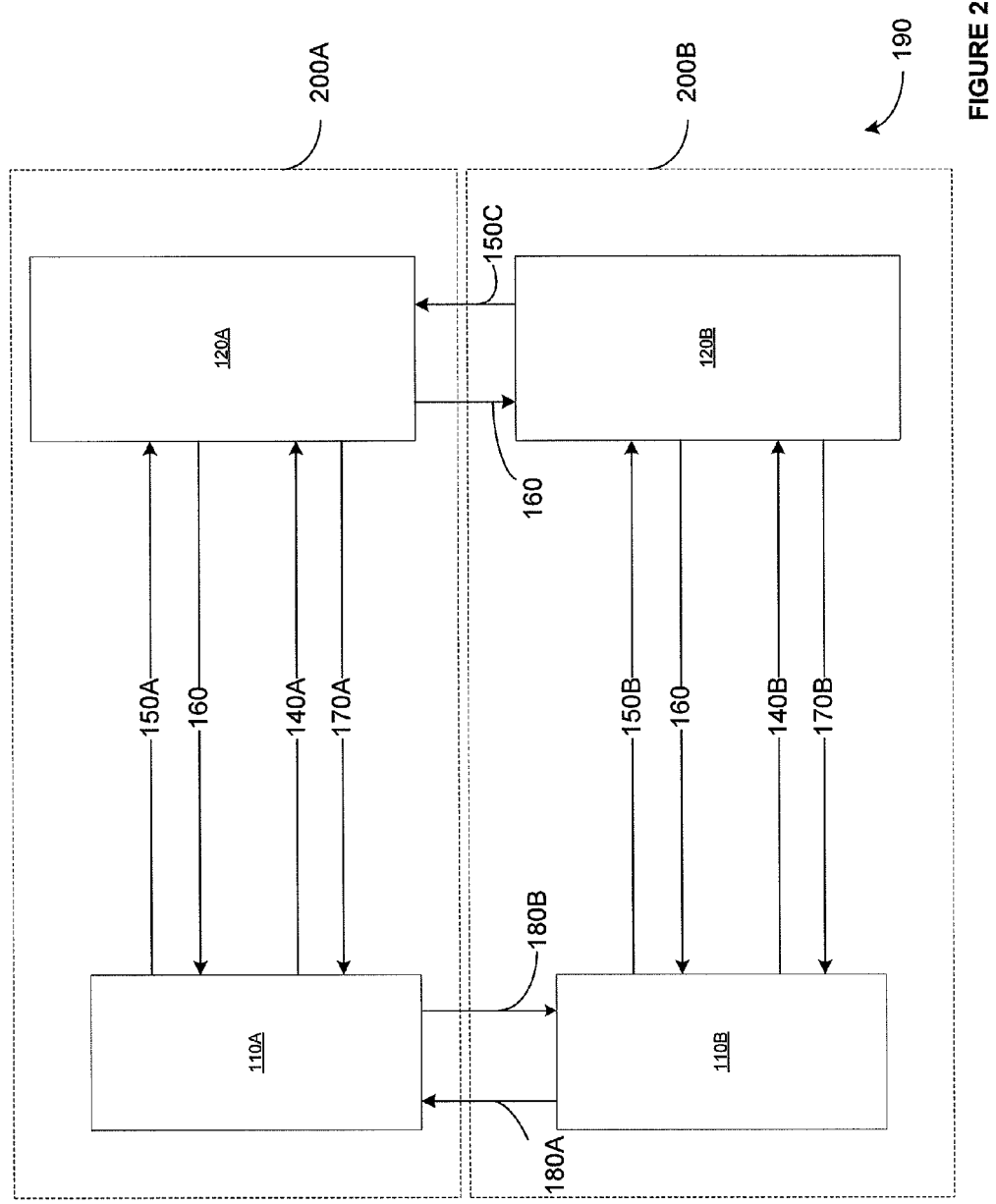
FIG. 2 is a schematic of a system for establishing an encrypted communication session over a communications network with clients who are members of different domains, according to another illustrative embodiment of the invention.

FIG. 2 is a schematic of a system 190 for establishing an encrypted communication session over a communications network, according to another illustrative embodiment of the invention. The clients 110A and 110B, collaborative groups and corresponding servers 120A and 120B can belong to (e.g., be members of) a corresponding domain 200A and 200B. A domain can be defined as a collection of users and network resources under the control of a single authority. Users, however, can collaborate across different domains. For example, a first client 110A and a first server 120A can belong in a first domain 200A. A second client 110B and a second server 120B can belong in a second domain 200B. The clients 110A and 110B and servers 120A and 120B as shown are capable of performing the tasks as the clients and servers as described above in FIG. 1 (e.g., joining a pre-defined collaborative group, establishing a collaborative group, selecting/ generating/retrieving encryption keys, receiving and transmitting encryption keys, receiving and transmitting communication parameters, receiving and transmitting collaborative content, etc.). The system 190 can support encrypted multicast communication sessions between users of the clients 110A and 110B.

Each server 120A and 120B can perform the tasks of transmitting encryption keys, authenticating client users, registering client users, etc. for the client 110A and 110B users in their home domain 200A and 200B. The servers 120A and 120B in the different domains 200A and 200B can have a mutual trust relationship. For example, if the first server 120A receives credentials 140A from the first client 110A user and authenticates the first client 110A user's credentials against stored credentials in a database (e.g., stored in server 120A or other server such as server 130 in FIG. 1), the second server 120B in the second domain 200B will not authenticate the first client 110A user from the first domain 200A.

Each server 120A and 120B in the home domain for the collaborative group can perform tasks of authorizing users for the collaborative group (e.g., determining the access permissions including determining if a user is authorized to request joining the group and the access mode (listener/contributor), etc.) Therefore, if a collaborative group belongs in a first domain 200A and the collaborative group includes a first client 110A user in the first domain 200A and a second client 110B user in the second domain 200B, the second server 120B can send authenticated identity information to first server 120A so that the first server can perform the task of authorization (e.g., determining access permissions of the user).

A first client 110A user can request to join a pre-defined collaborative group in a first domain 200A. The first client 110A can send the join request 150A to the server for its domain, server 120A, which can also be the server for the collaborative group. Client 110A can also send the credentials 140A for its user to first server 120A (usually when challenged). First server 120A can authenticate the client 110A's user, and check the access permissions for the collaborative group to determine if the user of the client 110A is authorized to access the group. If so, server 120A can retrieve or generate the encryption key 160 for the pre-defined collaborative group and send the encryption key 160 to the first client 110A over an appropriately secured connection. A second client 110B can send a request 150B to join a collaborative group to its domain server 120B. Client 110B can also send the credentials 140B of its user (usually when challenged by server 120B). Since the collaborative group is in domain 200A, server 120B, after authenticating the identity of client 110B's user using credentials 140B, can send the join request 150C to server 120A, along with the authenticated identity of client 110B's user. The first server 120A can transmit the encryption key 160 to the second server 120B in the second domain 200B over an appropriately secured connection. The second server 120B can then transmit the encryption key 160 to the second client 110B user over an appropriately secured connection. Clients 110A and 110B can then send or receive encrypted multicast communications 180A and 180B.

A first client 110A user in the first domain 200A can also request to establish a collaborative group in the first domain. The first server 120A can dynamically generate the collaborative group based on criteria received from the first client 110A or the first server 120A can search a database of collaborative groups (e.g., as shown in Table 2) to select a collaborative group that meets the specified criteria.

The first server 120A in the first domain 200A can also distribute the encryption key 160 used to encrypt the multicast communication session by either selecting the encryption key 160 from a database of encryption keys (e.g., such as Table 1 above, stored either on the first server 120A or another server such as an LDAP server as described in FIG. 1) or generating the encryption key 160 for the collaborative group and send the encryption key 160 to the first client 110A. The first server 120 can also transmit the encryption key 160 to the second server 120B in the second domain 200B. The second server 120B can then transmit the encryption key 160 to the second client 110B user in its home domain (e.g., the second domain 200B).

In some embodiments, the system 190 can include a third domain (not shown). A third server (e.g., server 120 as shown in FIG. 1 in the third domain) (not shown) can send, for example, an encryption key for the pre-defined collaborative group to the first client 110A of the first user via the first server 120A, where the first user and the first server 120A belong to the first domain 200A and the collaborative group and the third server belong to the third domain. The third server can also transmit a multicast address, a transport layer port number, an encryption algorithm selection, a message authentication code algorithm selection, a message authentication code key, an initialization vector or an access mode to the first client 110A of the first user via the first server 120A. If a security of the collaborative group is threatened, the server of the home domain for the collaborative group can send a new encryption key and/or a termination message to the users of the collaborative group via the server in the home domain for the user. By way of example, where the collaborative group belongs to the third domain, the third server can send a termination message to the first client 110A of the first user via the first server 120A belonging to the first domain 200A.

Figure 3:
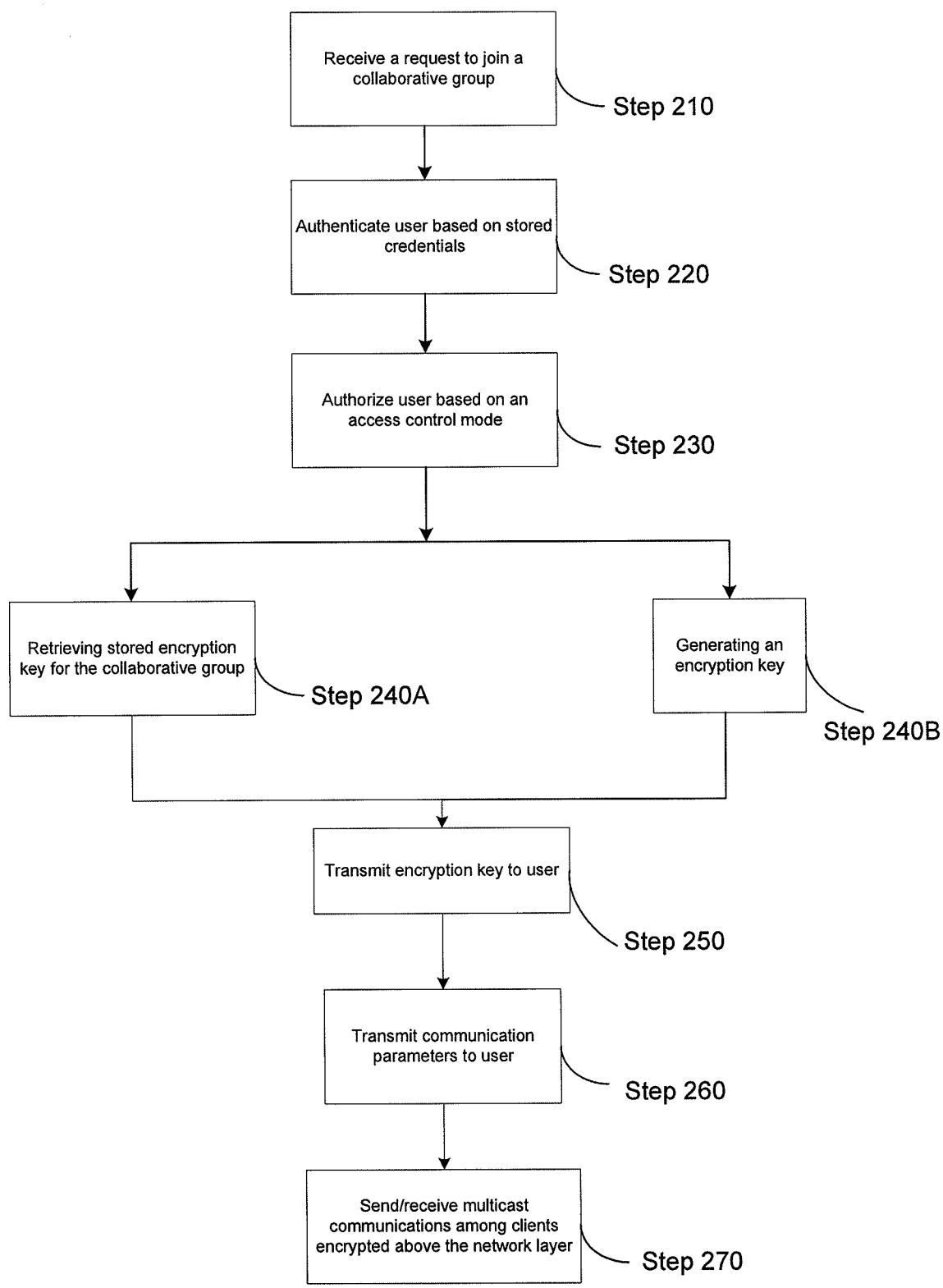
FIG. 3 is a diagram depicting a method for establishing an encrypted communication session for a pre-defined collaborative group, according to an illustrative embodiment of the invention.

FIG. 3 is a diagram depicting a method for establishing an encrypted communication session for a pre-defined collaborative group, according to an illustrative embodiment of the invention. The method can include the step of receiving a request to join a collaborative group at a server (e.g., transmitted from a client 110 as shown in FIG. 1) (Step 210). The method can include authenticating the identity of the client user using received credentials (e.g., inputted in the client by the user) against credentials stored in a database (e.g., stored in servers 120 and/or 130 as described above in FIG. 1) (Step 220). The method can include authorizing a user by determining the access permissions for the user (e.g., using a stored database of access permissions as described above in FIG. 1) (Step 230). An encryption key can be retrieved (Step 240A) or generated (e.g., by server 120 as shown in FIG. 1 or servers 120A or 120B as shown in FIG. 2) (Step 240B) and transmitted to the client user (e.g., or received at the client) (Step 250). Communication parameters such as a multicast address, a transport layer port number, an encryption algorithm selection, a message authentication code algorithm selection, a message authentication code key, an initialization vector or an access mode can also be transmitted (e.g., over an appropriately secured channel) to the client (e.g., received at the client user) (Step 260). Users can achieve multicast communications encrypted "end-to-end" above the network layer (e.g., at the application layer, among collaborative applications running on behalf of users on client devices such as laptops, workstations, radios, phones, PDAs, etc.) of the communications network (Step 270).

Figure 4:
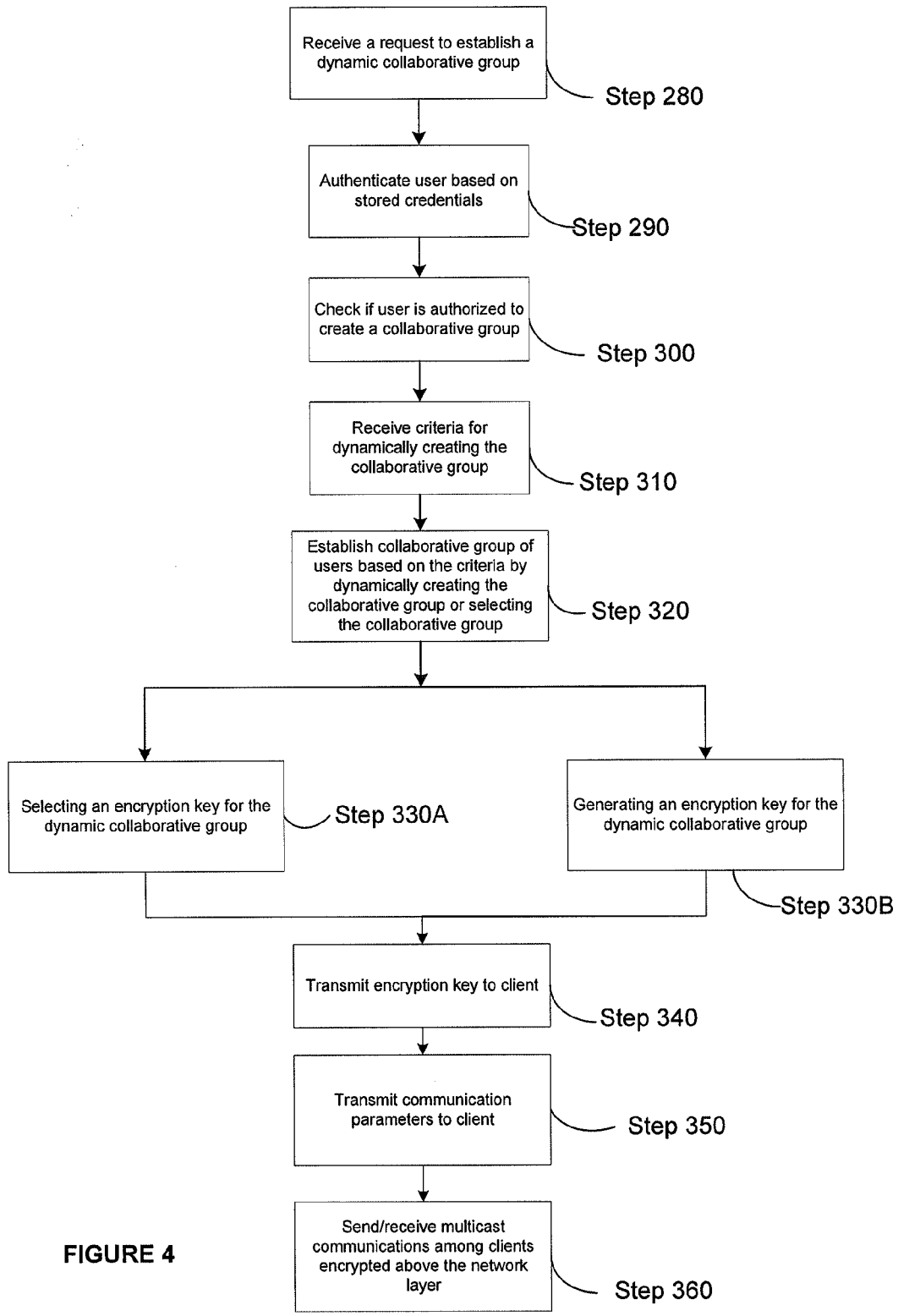
FIG. 4 is a diagram depicting a method for establishing an encrypted communication session for a collaborative group, according to another illustrative embodiment of the invention.

FIG. 4 is a diagram depicting a method for establishing an encrypted communication session for a collaborative group, according to another illustrative embodiment of the invention. The method can include the step of receiving a request to establish a collaborative group at a server (e.g., transmitted from the client 110A or 110B as shown in FIG. 1) (Step 280). The method can including authenticating the client's user using received credentials (e.g., inputted to and transmitted via the client 110A or 110B to the server 120 as shown in FIG. 1) against credentials stored in a database (e.g., stored in servers 120 and/or 130 as described above in FIG. 1) (Step 290). The method can include determining if user is authorized to create a collaborative group by consulting a data base of permissions for the user. (Step 300). The method can also include receiving criteria (e.g., transmitted from the client) for creating the collaborative group (Step 310). The collaborative group can be created or selected based on the criteria from the client user (Step 320). An encryption key can be selected from database of encryption keys (Step 330A) or generated/created (Step 330B). The encryption key can be transmitted to the client user (Step 340). Communication parameters such as a multicast address, a transport layer port number, an encryption algorithm selection, a message authentication code algorithm selection, a message authentication code key, an initialization vector or an access mode can also be transmitted to the client user (e.g., or received at the client user) (Step 350). Users can send and receive multicast communications encrypted end-to-end above the network layer (e.g., at the application layer, among collaborative applications running on behalf of users on clients) of the communications network. Multicast communications can be sent/received among the clients (e.g., clients 110A or 110B in FIG. 1 or 2) encrypted above the network layer of the communications network. (Step 360).

A request to establish a collaborative group (Step 280) can include criteria from a client user. The criteria can include, for example, specifying a set of identified users (e.g., explicitly identifying John Doe, Jane Doe, etc.), a geographical location, an organization or a rank of the users. A database (e.g., located on server 120 or 130 in FIG. 1) can store information relating to a user identifier, a geographical location, an organization or a rank for each individual users. A server (e.g., server 120 in FIG. 1 or servers 120A and 120B in FIG. 2) can use the database to determine which users satisfy the specified criteria and generate the dynamic collaborative group accordingly. The server can also search a stored database (e.g., Table 1 stored, for example, on server 120 or server 130 of FIG. 1) of collaborative groups for groups that include users that meet the specified criteria.

A server (e.g., server 120 as shown in FIG. 1 and server 120A or 120B in FIG. 2) can select encryption keys from a database of stored encryption keys (e.g., stored in server 120 or server 130 as shown in FIG. 1). The server can select an unused/unassigned encryption key from the database and assign an encryption key for the collaborative group (Step 330A). The server can also generate an encryption key, for example, using a random number generator (Step 330B).

The above-described techniques can be implemented in digital electronic circuitry, or in computer hardware, firmware, software, or in combinations of them. The implementation can be as a computer program product, i.e., a computer program tangibly embodied in an information carrier (e.g., in a machine-readable storage device or computer-readable storage medium/device/apparatus) for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. While the invention has been particularly shown and described with reference to specific illustrative embodiments, it should be understood that various changes in form and detail may be made without departing from the spirit and scope of the invention. The alternatives described herein are examples for illustration only and not to limit the alternatives in any way. The steps of the invention can be performed in a different order and still achieve desirable results.

What is claimed is:

1. A computerized method for dynamically establishing an encrypted collaborative communication session over a communications network, the method comprising:

receiving, by a server device, a request from at least a first user to join a pre-defined collaborative group including at least the first user and a second user, wherein the request includes a geographical location of the first user;

determining, by the server device, an access permission for joining the pre-defined collaborative group based on whether the geographical location of the first user is within a distance of a specified geographical location of the pre-defined collaborative group, wherein the access permission is no access, access as a contributor, or access as a listener;

retrieving or generating, by the server device, an encryption key for the pre-defined collaborative group;

transmitting, by the server device, the encryption key and the access permission for the pre-defined collaborative group to at least a first client device of the first user based on the access permission, allowing the first client device to encrypt or decrypt data using the encryption key to establish secure communication between the first client device and a second client device at a layer above a network layer within the Open System Interconnection (OSI) model;

transmitting, by the server device, a termination message to the first client device of the first user, a second client device of the second user, and a third client device of the third user to terminate the collaborative communication session;

transmitting, by the server device, a second encryption key to the first client device of the first user and the second client device of the second user;

transmitting, by the server device, the termination message and the second encryption key to the first client device of the first user, wherein the server device and the first user belong to a first domain; and transmitting via a second server device, the termination message and the second encryption key to a second client device of the second user, wherein the second server device and the second user belong to a second domain.

2. The method of claim 1, further comprising receiving an identifier for the pre-defined collaborative group from the first user to request joining the pre-defined collaborative group.

3. The method of claim 2, further comprising receiving a uniform resource identifier (URI) or a telephone number from the first user to request joining the pre-defined collaborative group.

4. The method of claim 1, further comprising receiving credentials for at least the first user.

5. The method of claim 4, further comprising verifying the credentials for the first user against stored credentials to authenticate the first user.

6. The method of claim 1, further comprising transmitting, via the server device, at least one of a multicast address, a transport layer port number, an encryption algorithm selection, a message authentication code algorithm selection, a message authentication code key, an initialization vector or an access mode to the first user.

7. The method of claim 1, further comprising transmitting, via a second server device, the encryption key for the pre-defined collaborative group to the second user, wherein the first user and the server computing device belong to a first domain and the second user and the second server computing device belong to a second domain.

8. The method of claim 7, further comprising transmitting, by a third server device, the encryption key for the pre-defined collaborative group to the first client device of the server device via the server device, wherein the first user and the server device belong to the first domain and the collaborative group and the third server device belong to a third domain.

9. The method of claim 7, further comprising transmitting, by a third server device, at least one of a multicast address, a transport layer port number, an encryption algorithm selection, a message authentication code algorithm selection, a message authentication code key, an initialization vector or an access mode to the first client of the first user via the first computing device, wherein the first user and the server device belong to the first domain and the collaborative group and the third server device belong to a third domain.

10. The method of claim 7, further comprising transmitting, by a third server device, a termination message to the first client of the first user via the first computing device, wherein the first user and the server device belong to the first domain and the collaborative group and the third server device belong to a third domain.

11. The method of claim 1, further comprising discontinuing, by the first client device, the use of the encryption key a predetermined time after transmitting the second encryption key.

12. The method of claim 1, further comprising transmitting a message to at least the first client device of the first user, the message including data corresponding to at least one of the encryption key, a multicast address, a transport layer port number, an encryption algorithm selection, a message authentication code algorithm selection, a message authentication code key, an initialization vector or an access mode.

13. A computerized method for dynamically establishing an encrypted collaborative communication session over a communications network, the method comprising:
receiving, by a server device, a request from a first user to create a collaborative group based on specified criteria, wherein the specified criteria includes a geographical location of the first user;
setting, by the server device, a geographical location of the collaborative group same as the geographical location of the first user;
determining, by the server device, an access permission for creating the collaborative group for the first user based on the specified criteria, wherein the access permission is no access, access as a contributor, or access as a listener;
selecting or generating, by the server device, an encryption key for the collaborative group; and
transmitting, by the server device, the encryption key and the access permission for the collaborative group to at least a first client device of the first user based on the access permission, allowing the first client device to encrypt or decrypt data using the encryption key to establish secure communication between the first client device and a second client device at a layer above a network layer within the Open System Interconnection (OSI) model;
transmitting, by the server device, a termination message to the first client device of the first user, a second client device of the second user, and a third client device of the third user to terminate the collaborative communication session;
transmitting, by the server device, a second encryption key to the first client device of the first user and the second client device of the second user;
transmitting, by the server device, the termination message and the second encryption key to the first client device of the first user, wherein the server device and the first user belong to a first domain; and
transmitting via a second server device, the termination message and the second encryption key to a second client device of the second user, wherein the second server device and the second user belong to a second domain.

14. The method of claim 13, wherein the specified criteria further includes at least one of an organization, a rank, or a set of users.

15. The method of claim 14, further comprising creating the collaborative group further based on at least one of the specified organization, the specified rank, or the specified set of users.

16. The method of claim 13, further comprising transmitting a message to at least the first client device of the first user, the message including data corresponding to at least one of the encryption key, a multicast address, a transport layer port number, an encryption algorithm selection, a message authentication code algorithm selection, a message authentication code key, an initialization vector or an access mode.

17. The method of claim 13, further comprising:
selecting and assigning the encryption key from two or more stored encryption keys; or
generating the encryption key using a random number generator.

18. A computerized method for dynamically joining an encrypted collaborative communication session over a communications network, the method comprising:
transmitting, by a first client device, a request to a server device for a first user to join a pre-defined collaborative group that includes at least the first user and a second user, wherein the request includes a geographical location of the first user;
receiving, by the first client device, an access permission from the server device, wherein the access permission is no access, access as a contributor, or access as a listener, and wherein the access permission is based on whether the geographical location of the first user is within a distance of a specified geographical location of the pre-defined collaborative group;
receiving, by the first client device, an encryption key allowing the first client device a) to transmit data to a second client device based on the access permission, the transmitted data encrypted using the encryption key at a layer above a network layer within the Open System Interconnection (OSI) model, and b) to receive data from the second client device based on the access permission, the received data decrypted using the encryption key at a layer above the network layer within the Open System Interconnection (OSI) model; and
receiving, by the first client device, from the server device, a termination message to terminate the collaborative communication session and a second encryption key, the server device and the first client device belong to a first domain, wherein the second encryption key can be transmitted by the server to the second client device, the second client device and a second server device belong to a second domain.

19. The method of claim 18, further comprising transmitting between a first application on the first client device and a second application on the second client device, collaborative content including at least voice or video, the content being encrypted end-application to end-application above the network layer of the communications network using the received encryption key as input to an encryption algorithm.

20. The method of claim 18, further comprising transmitting by the first client device to the computing device inputted credentials for at least the first user to authenticate the first user.

21. The method of claim 18, further comprising receiving a message by the first client device including at least one of the encryption key, a multicast address, a transport layer port number, an encryption algorithm selection, a message authentication code algorithm selection, a message authentication code key, an initialization vector or an access mode.

22. A computerized system for dynamically establishing an encrypted collaborative communication session over a communications network, the system comprising:

a client device for transmitting a request for a first user to join a pre-defined collaborative group including at least the first user and a second user, wherein the request includes a geographical location of the first user; and a server device for determining an access permission for joining the encrypted collaborative communication session for the first user based on a pre-defined collaborative group based on whether the geographical location of the first user is within a distance of a specified geographical location of the pre-defined collaborative group, wherein the access permission is no access, access as a contributor, or access as a listener, the server device further configured to retrieve or generate an encryption key for the pre-defined collaborative group and transmitting the encryption key and the access permission to the client device based on the access permission, wherein the client means transmits or receives data between at least the first user and the second user, the data encrypted using the encryption key at a layer above a network layer within the Open System Interconnection (OSI) model, the server device configured to transmit a termination message to the first client device of the first user, a second client device of the second user, and a third client device of the third user to terminate the collaborative communication session, the server device configured to transmit a second encryption key to the first client device of the first user and the second client device of the second user, the server device configured to transmit the termination message and the second encryption key to the first client device of the first user, wherein the server device and the first user belong to a first domain, and a second server device for transmitting the termination message and the second encryption key to a second client device of the second user, wherein the second server device and the second user belong to a second domain.

23. A system for dynamically establishing an encrypted collaborative communication session over a communications network, the system comprising:

a client device for transmitting a request for a first user to create a collaborative group based on specified criteria, wherein the specified criteria includes a geographical location of the first us; and a server device for setting a geographical location for the collaborative group to be the same as the geographical location of the first user and determining an access permission for creating the collaborative group based on the specified criteria, wherein the access permission is no access, access as a contributor, or access as a listener, the server device further configured to select or generate an encryption key for the collaborative group and to transmit the encryption key and the access permission to the client device based on the access permission, wherein the client device further configured to transmit or receive data between at least the first user and the second user, the data encrypted using the encryption key at a layer above a network layer within the Open System Interconnection (OSI) model, the server device configured to transmit a termination message to the first client device of the first user, a second client device of the second user, and a third client device of the third user to terminate the collaborative communication session, the server device configured to transmit a second encryption key to the first client device of the first user and the second client device of the second user, the server device configured to transmit the termination message and the second encryption key to the first client device of the first user, wherein the server device and the first user belong to a first domain, and a second server device for transmitting the termination message and the second encryption key to a second client device of the second user, wherein the second server device and the second user belong to a second domain.

* * * * *